A. M. THOMSON.
WORK HOLDER FOR SCREW THREADING MACHINES.
APPLICATION FILED AUG. 10, 1915.
1,200,047.
Patented Oct. 3, 1916.
3 SHEETS—SHEET 1.
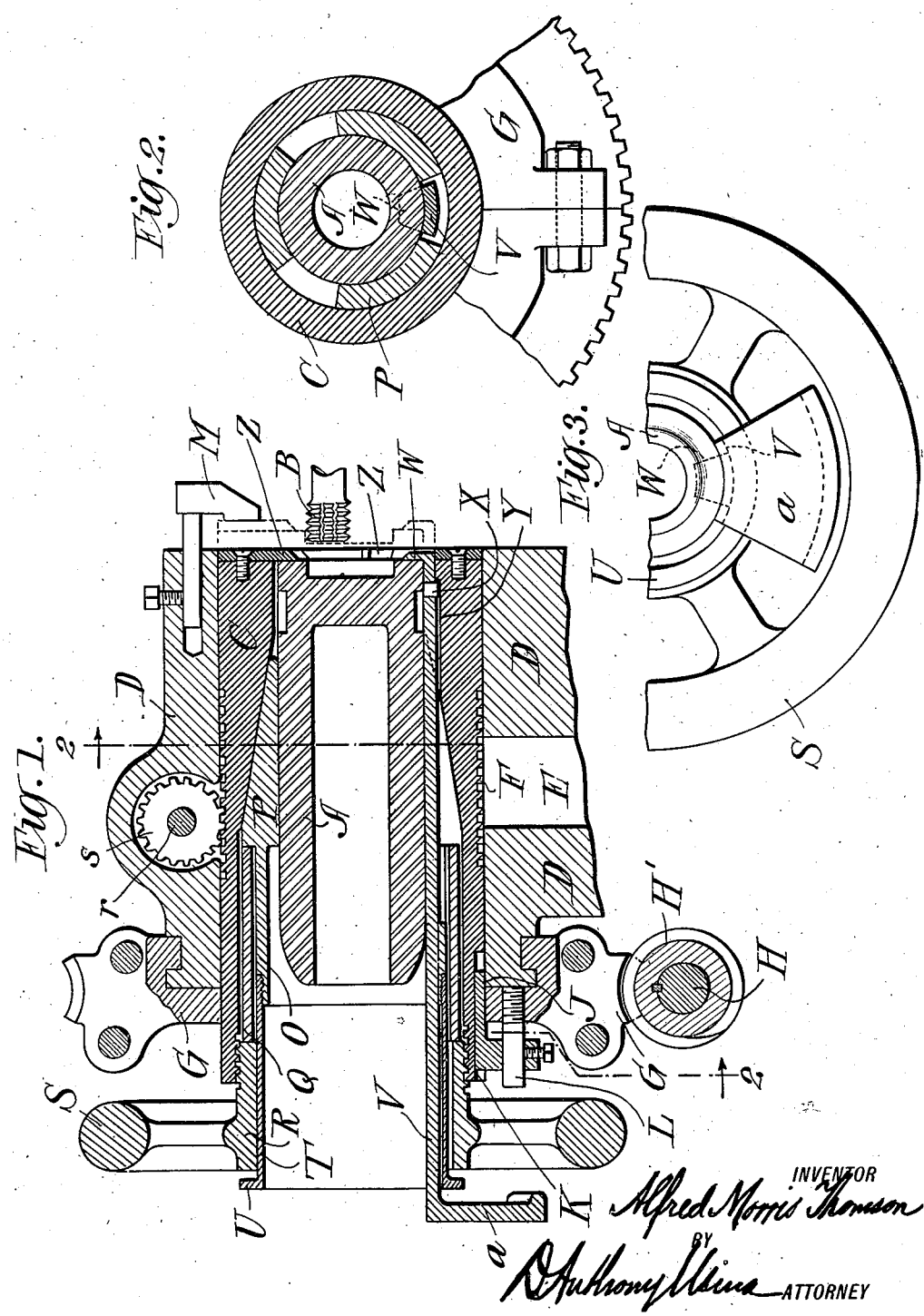

A. M. THOMSON.
WORK HOLDER FOR SCREW THREADING MACHINES.
APPLICATION FILED AUG. 10, 1915.
1,200,047.
Patented Oct. 3, 1916.
3 SHEETS—SHEET 2.
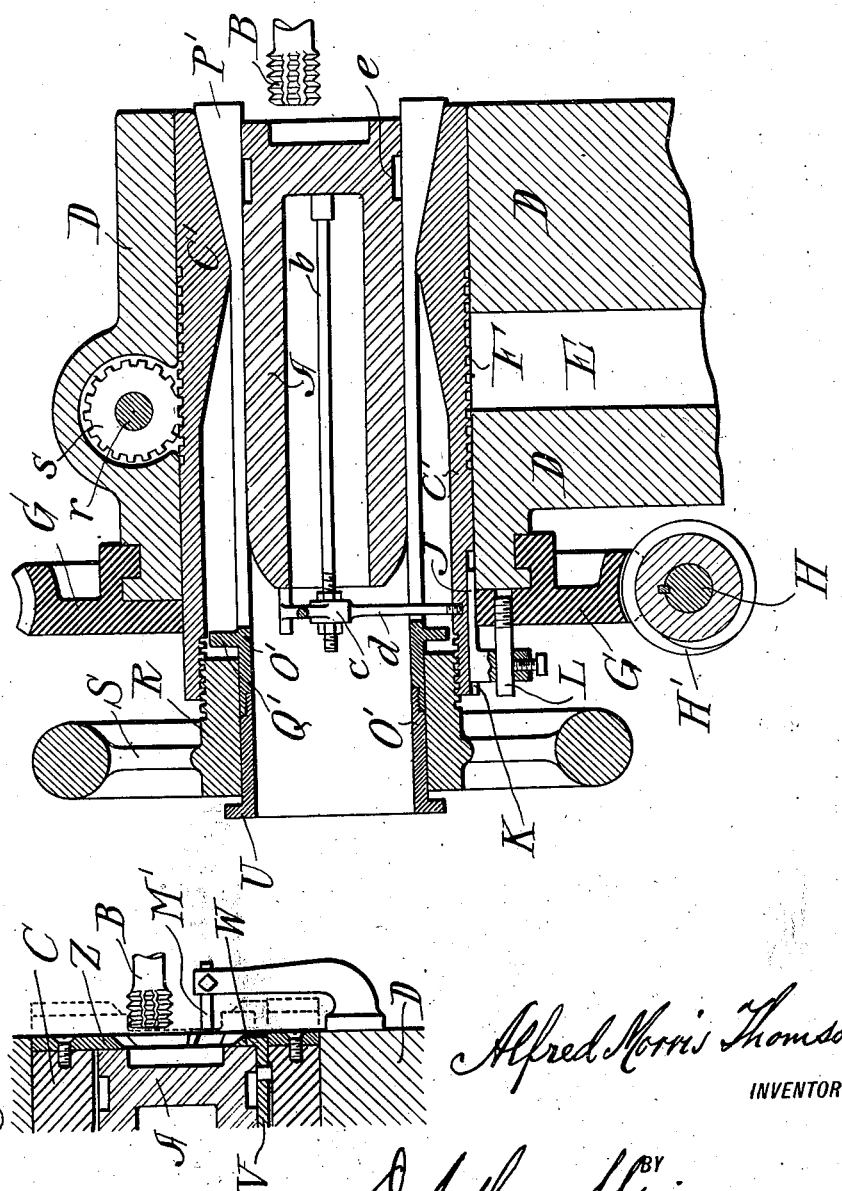
Alfred Morris Thomson
INVENTOR
BY D. Anthony Usina
ATTORNEY A. M. THOMSON.
WORK HOLDER FOR SCREW THREADING MACHINES.
APPLICATION FILED AUG. 10, 1915.
1,200,047.
Patented Oct. 3, 1916.
3 SHEETS—SHEET 3.
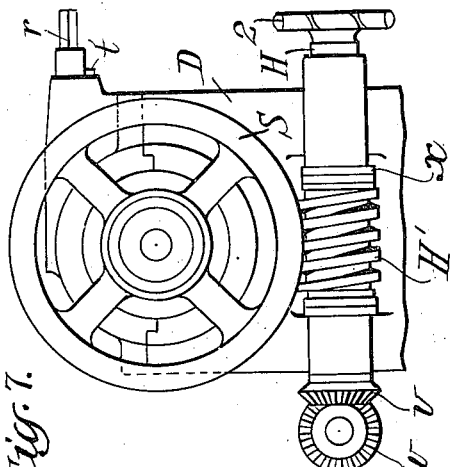
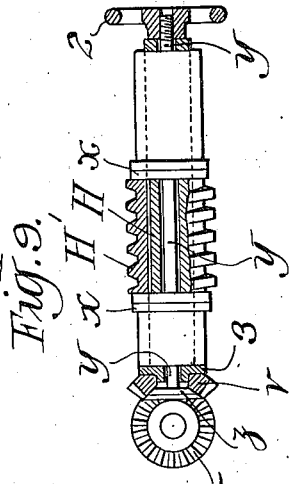
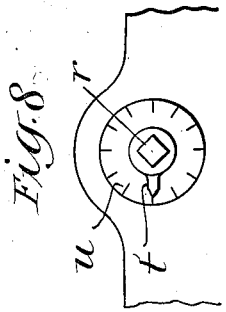
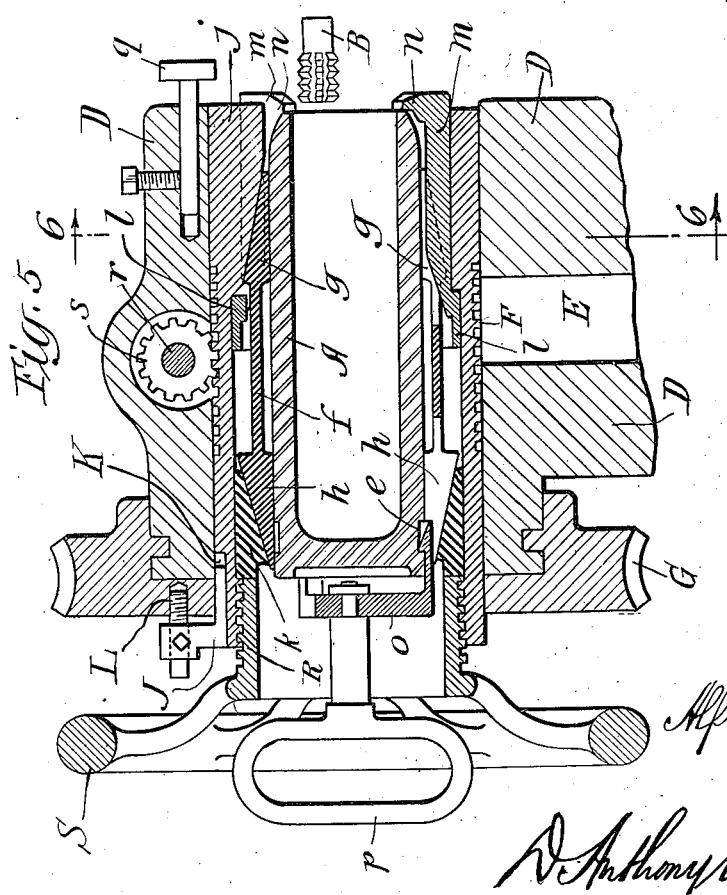
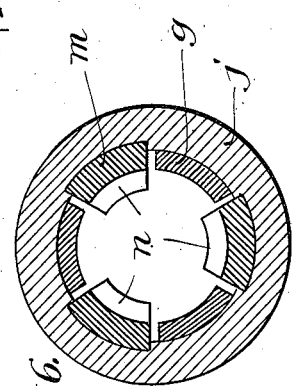
Alfred Morris Thomson
INVENTOR
BY
D. Anthony Usina ATTORNEY

UNITED STATES PATENT OFFICE.

ALFRED MORRIS THOMSON, OF NEWARK, NEW JERSEY.

WORK-HOLDER FOR SCREW-THREADING MACHINES.

1,200,047.  Specification of Letters Patent.  Patented Oct. 3, 1916.

Application filed August 10, 1915. Serial No. 44,735.

*To all whom it may concern:*

Be it known that I, ALFRED MORRIS THOMSON, a subject of the King of Great Britain, residing in Newark, New Jersey, have invented certain new and useful Improvements in Work-Holders for Screw-Threading Machines, of which the following is a specification.

In my pending application No. 43,252, filed August 2nd, 1915, I have described a certain type of machines for milling screw threads.

The present invention relates to improvements in means for holding the work for such screw thread milling machines or for other similar machines.

The work-holder of the present invention is designed to permit a rapid and easy handling of fairly heavy work.

The accompanying drawings illustrate embodiments of the invention.

Figure 1 is a longitudinal section of one style of holder; Fig. 2 is a cross-section of the same on the line 2—2 of Fig. 1; Fig. 3 is a rear end view thereof; Fig. 3ª is a modified detail; Fig. 4 is a longitudinal section of another style of holder; Fig. 5 is a longitudinal section of a third style; Fig. 6 is a cross-section of the spindle of Fig. 5 on the line 6—6; Fig. 7 is a rear end elevation of the holder of Fig. 5 on a smaller scale; Fig. 8 is a side elevation of a detail; Fig. 9 is a section of another detail.

Referring to the embodiments of the invention illustrated, the piece of work shown is the shell A which is to be internally threaded at one or both ends by means of a rotating milling cutter B.

The work-holder C (referring first to Figs. 1, 2 and 3) is in the form of a large hollow spindle adapted to rotate in a bearing block D mounted in fixed position on the bed of the machines, the holder or spindle being provided with a worm F constituting a lead screw and adapted to engage a nut (not shown) located in the space E in the lower part of the bearing block and arranged to slide upward into engagement with the worm F when it is desired to feed the work forward, so that the holder as it is rotated is also fed forward at the desired rate. The holder is rotated by means of a worm gear G formed of two halves bolted together and mounted on the bearing block D so as to be free to rotate but not to move longitudinally. The gear is driven by a worm H' splined on a shaft H. This worm wheel G is splined on the spindle C of the holder, preferably at three points in the circumference of the latter. At one of these points a spline J is used traveling in a channel K in the hollow spindle and adjusted to a suitable point on a pin L which is fastened to the worm wheel G, the spline J serving as an adjustable stop to limit the rearward movement of the spindle when the threaded shell is being removed therefrom. To prevent the spindle from being moved too far forward when the shell is slid into it, a stop M is provided adjustably mounted by a set screw on the front of the bearing D and overlying the forward end of the spindle C. It will be understood that the stops J and M come into use when the lead screw F is disengaged from the feed nut so that the spindle is free to slide in its bearings except for the stops referred to.

The machine is arranged for threading the butt end of the shell in one direction and the point of the shell in the opposite direction, the threads at opposite ends being, however, of the same diameter and pitch. The cutter B is rotated in the same direction for both threads, the work being fed forward in one case and backward in the other to make one thread a right-hand and the other a left-hand. In the case illustrated, the butt end of the shell is to be threaded by a backward feed. The shell, therefore, is introduced butt end foremost as shown and the spindle C shoved forward until it strikes the stop M; which is so adjusted that the bottom of the recess in the shell will approach close to the end of the cutter B without bumping against it (see dotted line position, Fig. 1). The cutter will then be lifted into engagement with the shell and the feed will simultaneously commence, the holder with the shell moving backward to cause the cutting of what we may call a left hand thread. For threading the point of the shell, the latter will be reversed in the holder and clamped, and the holder shoved back until stopped by the stop J, which is adjusted to bring the end of the shell in line with the cutter. Then the cutter is raised into engagement with the shell and the holder and shell are fed forward to cut a thread in the opposite, or right-hand, direction.

The shell is clamped in place by means of a collet O having a split tapered forward portion forming elastic fingers P which have their outer faces tapered so as to engage the inner tapered face of the hollow spindle C. A thrust ring Q engages shoulders on the fingers P and is in turn engaged at its rear end by the hub R of a hand wheel S. This hub screws into the rear end of the hollow spindle C and thus forces the collet forward and wedges the fingers P inward to clamp the shell. The collet carries at its rear end a ring or tube T which is threaded on the collet and which has at its rear end a flange U adapted to be engaged by the hub of the hand wheel S when the latter is unscrewed. Thus, screwing the hand wheel in one direction clamps the work and screwing it in the opposite direction releases it.

A device is also provided for drawing back the shell out of the holder after it has been threaded and for conveniently introducing the shell into the holder. It will be observed that the fingers P of the collet are offset inward from the rear portion O thereof so as to leave an annular space between the rear portion of the collet and the shell. A rod V of the shell handling device passes through this annular space and through the split between the fingers of the collet at the lower point and has an inturned end flange W to engage the end of the shell. This rod V has also a pin X adapted to travel in a groove Y in the spindle and to limit the forward movement of the rod by striking the end of this groove. The hollow spindle C itself has at suitable points an inwardly extending end flange Z which limits the position to which the shell may be thrust in the holder. The rear end of the rod V projects slightly out of the holder and is provided with a handle $a$ of the form illustrated by which the operator can pull the shell backward out of the holder until it is in a position to be easily seized by his hands and carried away. When a new shell is inserted the forward end of it strikes the flange W on the end of the rod V so that this rod is carried forward with the shell until the latter strikes the fixed stop flange Z. The operator has then only to turn the hand wheel S sufficiently to clamp the shell in the spindle and then to lift the cutter and start the feed.

Fig. 3$^a$ shows a modified form of front stop to take the place of the stop M of Fig. 1 when the thread is to be cut on workpieces of varying depths; as, for example, where the shell is to be threaded before its end is cut off to the desired length. In this case, the stop M' is mounted in a position to engage the bottom of the recess in the shell as the latter is advanced toward the cutter so as to coöperate with the workpiece directly instead of with the holder as in Fig. 1. The stop M' is adjustably mounted on a bracket fast on the lower part of the bearing D.

In some cases it is desirable to enter the work into the holder from the front (the cutter B being shifted to one side to permit the introducing of the work). Fig. 4 shows the invention adapted to be operated in this way. The spindle C' in this case is made with its bore flaring in the forward direction and the collet O' has its fingers P' made thicker toward the forward end, so that the collet is pulled to the rear to clamp it. The clamping means comprises a hand wheel S having a hub R threaded in the spindle as before and adapted when it is screwed inward to strike a shoulder Q' on the collet, and when it is screwed outward to strike an end flange U on the same, thus moving the collet forward or rearward and releasing or clamping it. The inward movement of the shell is limited by a stop rod $b$ which is fastened adjustably in the hub $c$ of a spider whose arms $d$ are passed through the slots of the collet and fastened into the spindle C'. The shell A is withdrawn through the forward end of the holder after the thread has been cut, the milling cutter B being first withdrawn. The shell may be withdrawn by means of a device similar to the bar V of Fig. 1, inserted through one of the slots in the collet and engaging a groove $e$ near the forward end of the shell; or extending clear to the innermost end of the shell and having a flange engaging such end.

Figs. 5 to 8 illustrate a further modification of the holder to utilize a double collet. The shell A in this case is gripped by a double collet $f$ having split opposite ends $g$ and $h$ tapered on their outer faces toward the opposite end of the holder. The hollow spindle $j$ has a tapered face bearing against the forward end $g$ of the collet. A ring $k$ is arranged to slide in the rear end of the spindle and has an inner tapered face adapted to bear on the rear end $h$ of the collet; the taper at the rear end being more abrupt than at the front end, so that when the ring $k$ is pushed inward it will push the collet forward and clamp the forward end $g$ firmly before clamping the rear end. The ring $k$ is pushed in by the hub R of the hand wheel S as in the previously described constructions. By this means there is a clamping of the shell at both ends which holds it steadier than if it were clamped at the cutting point only. A stop for limiting the forward movement of the shell in the holder is made in this case in the form of a ring $l$ located within the holder and having a limited longitudinal movement therein and having fingers $m$ lying in longitudinal grooves in the holder and in the forward portion $g$ of the collet, the outer ends of said fingers being extended inward to form flanges $n$ which will be struck by the forward end of the shell as the latter is shoved into the holder from the rear. The means for withdrawing the shell from the holder in this case consists of a spider *o* with spring fingers so located as to permit their passage through the slots in the rear end of the collet and having their ends bent inward so that they may be snapped into the grooves *e* near the rear end of the shell; the spider *o* being attached to a loop *p* by which the operator can take hold of it and can easily swing the shell into or out of the holder. This same device for handling the shell may be used in connection with the holders of Figs. 1 and 3.

A combination spline and stop J is provided similar to the stop J of Fig. 1 working in a groove K for limiting the rearward movement of the spindle in its bearing. A forward stop *q* adjustably mounted in the fixed part of the machine limits the forward movement of the spindle.

The upper part of the bearing carries at a central position a transverse shaft *r* which carries a pinion *s* fixed on the shaft and meshing with the teeth of the lead screw F. The shaft *r* extends out to the front of the machine where it has a squared end as shown in Fig. 7. By means of a wrench the operator may turn this shaft *r* to adjust the holder longitudinally. The shaft *r* carries also a pointer *t* which passes over a dial *u* (Fig. 8) and indicates, at is registration with one of the other of the lines on the dial, that the lead screw F is in correct longitudinal position to register with the nut which is brought up against it for the purpose of feeding the work.

The shaft H which drives the worm H' is operated by frictional engagement with the beveled gear *v* on its rear end which is driven by a gear *w* adapted to be rotated in either direction so as to turn the worm wheel G and the spindle in either direction and thus feed the work forward or backward to cut a right-hand or a left-hand screw. The mounting of the shaft H is shown in Fig. 9. The worm H' is supported between bearings *x* and is splined on the shaft H on the rear end of which the beveled gear is loosely carried. The shaft H is hollow and a clamping rod *y* passes through it and through the gear and has a head *z* engaging the outer face of the gear. The front end of the rod *y* is threaded into a wing nut 2 which is screwed up against the end of the hollow shaft H to draw the gear against a flange 3 on the shaft so as to drive the shaft by friction. This friction causes the gear to slip on the shaft if the machine overruns its intended travel; the end of the lead screw arriving at the feed nut and locking the spindle and the worm wheel G against further movement.

Though I have described with great particularity of detail certain specific embodiment of the invention, yet it is not to be understood therefrom that the invention is restricted to the particular embodiment disclosed. Various modifications thereof in detail and in the arrangement of the parts may be made by those skilled in the art without departing from the invention as defined in the following claims.

What I claim is—

1. A work-holder for machines of the class described including in combination a hollow spindle adapted to entirely inclose the work, a collet in said spindle, means for clamping the collet on the work, means for feeding the spindle longitudinally and means for limiting the longitudinal movement of the spindle.

2. A work-holder for machines of the class described including in combination a hollow spindle adapted to entirely inclose the work, a collet in said spindle, means for clamping the collet on the work, means for feeding the spindle longitudinally and means adapted to engage the work for limiting the longitudinal movement of the spindle.

3. A work-holder for machines of the class described including in combination a hollow spindle adapted to entirely inclose the work, a collet in said spindle, means for clamping the collet on the work, means for moving the spindle forward and rearward, and stops for limiting the forward and rearward movement of said spindle.

4. A work-holder for machines of the class described including in combination a hollow spindle adapted to entirely inclose the work, a collet in said spindle, means for clamping the collet on the work, means for rotating said spindle, means for feeding the spindle longitudinally, said spindle and rotating means having a groove of limited length and a spline traveling in said groove and serving as a stop to engage the end of the groove and limit the longitudinal movement of the spindle.

5. A work-holder for machines of the class described including in combination a hollow spindle, a split collet in said spindle, and a device for withdrawing the work having a portion passing between the fingers of the collet and having an inward flange adapted to engage the work.

6. A work-holder for machines of the class described including in combination means for carrying the work, a lead screw for feeding said carrier, and a pinion engaging said screw for shifting the carrier longitudinally.

In witness whereof, I have hereunto signed my name.

ALFRED MORRIS THOMSON.